(12) United States Patent
Alexander et al.

(10) Patent No.: US 6,344,915 B1
(45) Date of Patent: Feb. 5, 2002

(54) SYSTEM AND METHOD FOR SHUTTING OFF AN OPTICAL ENERGY SOURCE IN A COMMUNICATION SYSTEM HAVING OPTICAL AMPLIFIERS

(75) Inventors: Stephen B. Alexander, Millersville; Cecil D. Smith, Annapolis; Roy C. Litz, Freeland; Robert M. Corwin, Finksburg; John L. Shanton, III, Jefferson; Donald T. Newman, Severna Park, all of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/152,892

(22) Filed: Jun. 19, 1998

Related U.S. Application Data

(60) Provisional application No. 60/050,368, filed on Jun. 20, 1997.

(51) Int. Cl.[7] .................. H04B 10/16; H04B 10/02
(52) U.S. Cl. .................. 359/177; 359/179; 359/134; 359/341.2; 359/341.44
(58) Field of Search .................. 359/134, 139, 359/177, 179, 337

(56) References Cited

U.S. PATENT DOCUMENTS 5,296,957 A * 3/1994 Takahashi et al. .......... 359/177
5,943,146 A * 8/1999 Harano ........................ 359/110

* cited by examiner

*Primary Examiner*—Leslie Pascal
*Assistant Examiner*—M. R. Sedighian
(74) *Attorney, Agent, or Firm*—David L. Soltz

(57) ABSTRACT

The present invention provides a system and method for intelligently shutting down an optical energy source in a communication system having optical amplifiers upon detection of a system failure.

20 Claims, 6 Drawing Sheets

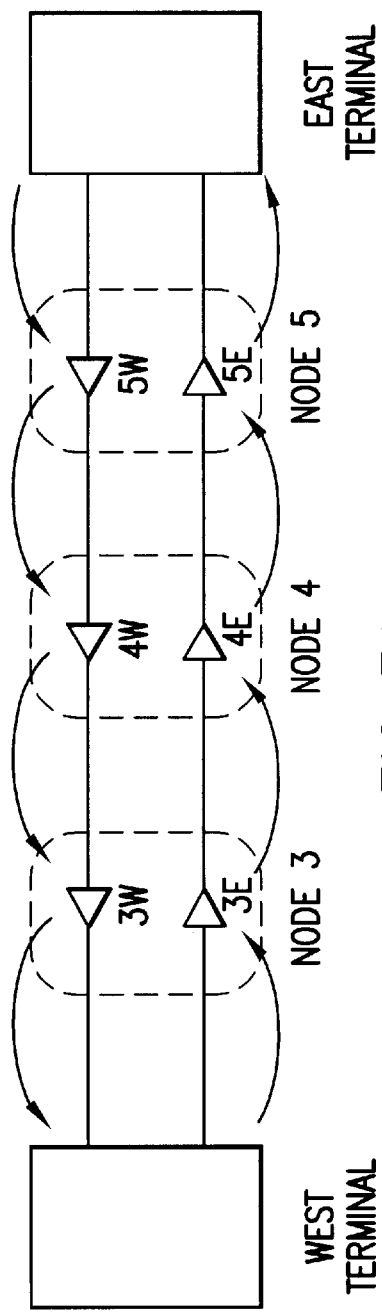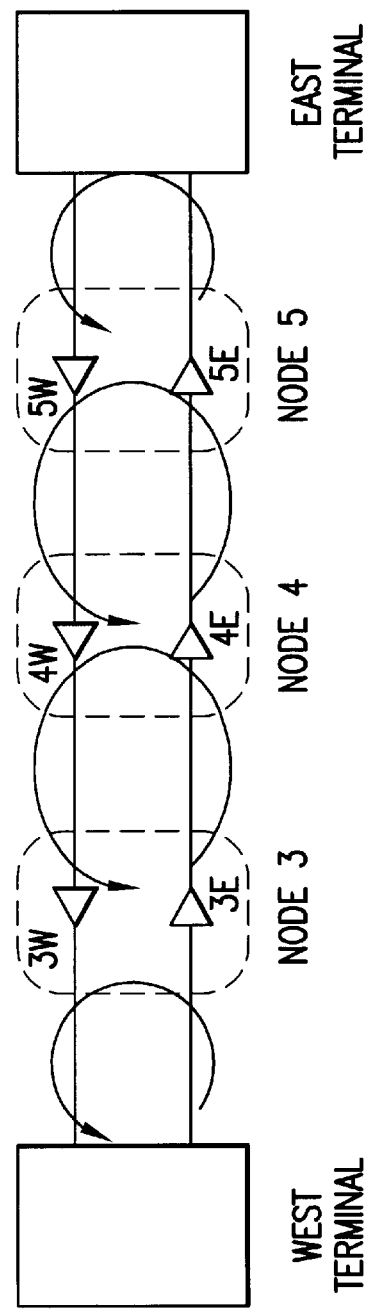
FIG.3A
FIG.3B

SYSTEM AND METHOD FOR SHUTTING OFF AN OPTICAL ENERGY SOURCE IN A COMMUNICATION SYSTEM HAVING OPTICAL AMPLIFIERS

This application claims priority of U.S. Provisional Application Serial No. 60/050,368 filed Jun. 20, 1997.

FIELD OF THE INVENTION

The present invention relates to communication systems having optical amplifiers. More particularly, the present invention relates to a system and method for shutting off an optical energy source in an optical communication system in order to protect service personnel repairing a system failure who might otherwise be exposed to harmful optical energy emissions. The present invention is particularly well suited for use in a wavelength division multiplexed (WDM) optical communication system having node distributed intelligence.

BACKGROUND OF THE INVENTION

Optical communication systems are a substantial and fast-growing constituent of communication networks. The expression "optical communication system," as used herein, relates to any system which uses optical signals to convey information across an optical waveguide medium. Such optical communication systems include, for example, telecommunications systems, cable television systems, and local area networks (LANs).

Optical communication systems in all their forms are currently being challenged by dramatically increasing capacity demands. Current capacity, which is a function of existing waveguide media, is routinely exceeded by an ever increasing traffic of telephone, facsimile, computer Internet, and video data. In theory, this limited system capacity might be expanded by installing additional waveguide media. However, obtaining the necessary rights of way and installing the additional waveguide media are so costly that such expansion is impractical in many instances.

Thus, WDM optical communication systems are currently being incorporated into existing waveguide networks to increase capacity. In a WDM system, a plurality of optical communication signals are carried over a single waveguide, each signal being assigned a particular wavelength. U.S. Pat. Nos. 5,504,609; 5,532,864 and 5,557,439, the disclosures of which are incorporated herein by reference, teach several basic aspects of successful, contemporary WDM systems.

The use of optical amplifiers in WI)M systems to directly and simultaneously amplify a plurality of optical communication signals make WDM systems particularly useful in long distance optical networks. Optical amplifiers are commonly formed by the combination of a section of doped, or "active," fiber and an optical energy source, typically a pump laser. The active fiber containing a fluorescent substance, generally a rare-earth dopant, accepts energy from the optical energy source, and transfers a portion of the optical energy to an information bearing optical communication signal, or a plurality of optical communication signals traversing the active fiber. The material composition and operation of active fiber amplifiers, is well documented; for example by Bjarklev, *Optical Fiber Amplifiers: Design and System Application*, (Artech House, Norwood, Mass.), c.1993 and *Erbium-Doped Fiber Amplifiers*, (John Wiley & Sons, Inc., N.Y.) c. 1994, the disclosures of which are incorporated herein by reference. As used in the context of the present invention, the term "active fiber amplifier," is broadly construed to cover the entire class of devices, typically comprising a section of active fiber and an optical energy source, without regard to the particular composition of the active fiber or the exact structure and operating characteristics of the optical energy source. Furthermore, for the sake of simplicity throughout the subsequent description of the present invention, the entire, complex interaction between the optical energy source and the active fiber section, whereby optical energy is transferred from the optical energy source to the information bearing optical signal is referred to as the optical energy source "driving" the optical amplifier.

Unfortunately, the light wavelengths at which many conventional optical energy sources operate are hazardous to the human eye. This well known fact presents optical communication system designers with the challenge of incorporating a mechanism and/or a protocol for shutting off optical energy sources upon detection of a system fault. A "system fault," as used in describing the present invention, is any mishap or condition which subsequently requires service personnel to intervene at a fiber level within the optical communication system. Typical system faults include a break or dislocation in the waveguide media, an optical amplifier failure, or other event requiring system element replacement.

Previous attempts to address the problem of shutting down the optical energy sources in an optical communication system following detection of a system fault have met with limited success. More importantly, these early attempts severely underperform when compared to what may be accomplished with increasing "intelligent" optical communication systems.

Referring to FIG. 1, a simplified optical communication system is shown comprising a West terminal 1, an East terminal 2, and intermediate optical line amplifiers 3, 4, and 5, comprising amplifier nodes 3E, 4E, and 5E arranged along an "East" running waveguide transmitting optical communication signals in a West-to-East direction, and amplifier 3W, 4W, and 5W arranged along a "West" running waveguide transmitting optical communication signals in a East-to West direction. (As used in the present invention the terms "transmit," and "transmission" are used to describe the processes of placing an optical signal in a waveguide, the physical movement of the optical signal via the waveguide, and/or the removal of the optical signal from the waveguide). Amplifiers 3E and 3W form intermediate amplifier 3, amplifiers 4E and 4W form intermediate amplifier 4, and amplifies 5E and 5W form intermediate amplifier 5. If a break in the paired East/West waveguides is assumed between intermediate amplifiers 3 and 4, the limitations of conventional safety shut down systems and methods are readily manifest.

Since each intermediate amplifier nominally includes paired amplifier nodes, such as (3E, 3W) and (4E, 4W) in FIG. 1, some early optical communication systems, upon directly detecting the loss of the East running optical communication signal at node 4E, for example, would shut off the optical energy source in the 4W amplifier node. With the resulting absence of an optical communication signal from 4W, 3W would shut off the optical energy source in 3E. Thus, no potentially harmful emissions from amplifier nodes 3E and 4W would escape the waveguide break. While this system quickly resolved the safety hazard, it also placed the optical communication system in a undesirable state. For example, the operational status of intermediate node 5 could not be determined once the system was shut down at intermediate nodes 3 and 4. Further, optical communication systems including such a shut down mechanism required node by node re-initiation of the system, since the intermediate amplifiers could not discriminate between the re-initiation of the optical communication signal and noise, such as a spontaneous optical amplifier emission.

Later attempts were made to remedy these problems, such as in U.S. Pat. No. 5,355,250 (the '250 patent). The '250 patent teaches a system which shuts off an optical energy source based on the detected magnitude of an optical communication signal at the input of an optical amplifier. Following detection, the sampled magnitude is compared to a predetermined reference value, and upon failing to meet this value the drive circuit for the optical energy source is turned off. In the system disclosed in '250 patent and similar systems, the entire bi-directional loop must be shut down node-by-node in cascade to secure portions of the optical communication system posing a safety threat. This result is explained in greater detail below.

In the system disclosed in the '250 patent, the entire bi-directional loop, between West terminal 1 and East terminal 2, for the example shown in FIG. 1, would be shut down in a cascade of signal loss detections. Again referring to the exemplary system of FIG. 1 and beginning arbitrarily at node 4E at the time the paired waveguides are broken between intermediate amplifiers 3 and 4, the loss of the optical communication signal is detected at node 4E and the optical energy source driving the optical amplifier at node 4E is turned off. The resulting absence of an optical signal at the output of node 4E is subsequently detected at SE which shuts off the optical energy source driving the optical amplifier at node 5E. This process continues until the cascade of optical communication signal "failures" propagates around the loop to reach node 3E. Thus, while only the optical energy between intermediate amplifiers 3 and 4 is capable of escaping at the waveguide break and potentially injuring service personnel, the entire optical communication system is shut down.

Again, the resulting operational status of the overall optical communication system is undesirable. In the forgoing example, there is no safety reason to shut down the optical amplifiers at amplifier nodes 4E, 5E, 5W and 3W. In fact, in a WDM system, like the one disclosed in U.S. Pat. No. 5,555,118, the disclosure of which is incorporated herein by reference, having the ability to add and drop selected channels at one or more intermediate nodes, the loss of every amplifier node in the optical communication system due to a single point system fault unnecessarily limits system performance. As a particular example, if optical signals corresponding to several channels of West-to-East traffic are routinely injected into the East running waveguide it intermediate amplifier 4 for transmission to East terminal 2, there is no reason why amplifier nodes 4E and 5E can not transmit these signals even after a system fault occurring between intermediate amplifiers 3 and 4. Further, even in the absence of added optical signals, the ability to transmit and receive service channel signal(s) between intermediate and terminal nodes unaffected by the system fault is of great value.

SUMMARY OF THE INVENTION

The present invention provides a system for shutting down an optical energy source in an optical communication system. The system includes an upstream node and a downstream node. The upstream node transmits a first optical communication signal and a first service channel signal to the downstream node, and receives a second optical communication signal and a second service channel signal from the downstream node. The first and second optical communication signals may consist of a single optical wavelength or a plurality of multiplexed optical wavelengths.

The downstream node comprises, a downstream service channel circuit receiving the first service channel signal from the upstream node, a first downstream optical amplifier receiving the first optical communication signal from the upstream node and amplifying the first optical communication signal, a second downstream optical amplifier amplifying and transmitting the second optical communication signal to the upstream node, a downstream optical energy source adapted to drive at least the second downstream optical amplifier, and a downstream node control processor communicating with the downstream service channel circuit to determine the state of the first service channel signal, determining the level of the first optical communication signal, and communicating with the downstream optical energy source to shut it off upon determining either an alarm state in the first service channel signal, or an alarm level in the first optical communication signal.

The present invention is particularly well adapted to operation in systems wherein the first and second optical amplifiers are multistage amplifiers. In such systems, the node control processor will shut off only those optical energy sources providing potentially harmful optical emissions, without otherwise effecting overall system performance.

In another aspect, the present invention provides a method of shutting down an optical energy source in a wavelength division multiplexed optical communication system. The optical communication system comprises N nodes arranged along first and second optical waveguides. The method comprises the steps of receiving at node Ni a first plurality of optical communication signals and a first service channel signal from node Ni-1 via the first optical waveguide, amplifying the first plurality of optical communication signals received at node Ni using a first optical amplifier driven by an optical energy source, receiving at node Ni a second plurality of optical communication signals from node Ni+1 via the second optical waveguide, amplifying the second plurality of optical communication signals received at node Ni using a second optical amplifier driven by the optical energy source, determining the state of the first service channel signal received at node Ni, determining the level of the first plurality of optical communication signals received at node Ni; and upon determining one of an alarm state in the first service channel signal and an alarm level in the first plurality of optical communication signals, shutting down the optical energy source.

BRIEF DESCRIPTION OF THE DRAWINGS

FIGS. 3A and 3B show alternative transmission paths for service channel communications in the optical communication system of FIG 1;

DETAILED DESCRIPTION

This application claims the benefit of U.S. Provisional Application 60/050,368 filed Jun. 20, 1997.

Enhanced service channel functionality in an optical communication system is made possible by the use of "intelligent" control processors at each node within the system. Such distributed intelligence is integral to advanced node functionality, including node-wise system self diagnosis, optical channel add/drop capabilities, and system safety features. An optical communication system having node distributed intelligence is disclosed in U.S. patent application Ser. No. 08/862,864 filed May 23, 1997 and U.S. Provisional Application Serial No. 60/047,537 filed May 21, 1997, the disclosures of which is incorporated herein by reference.

Figure 1:
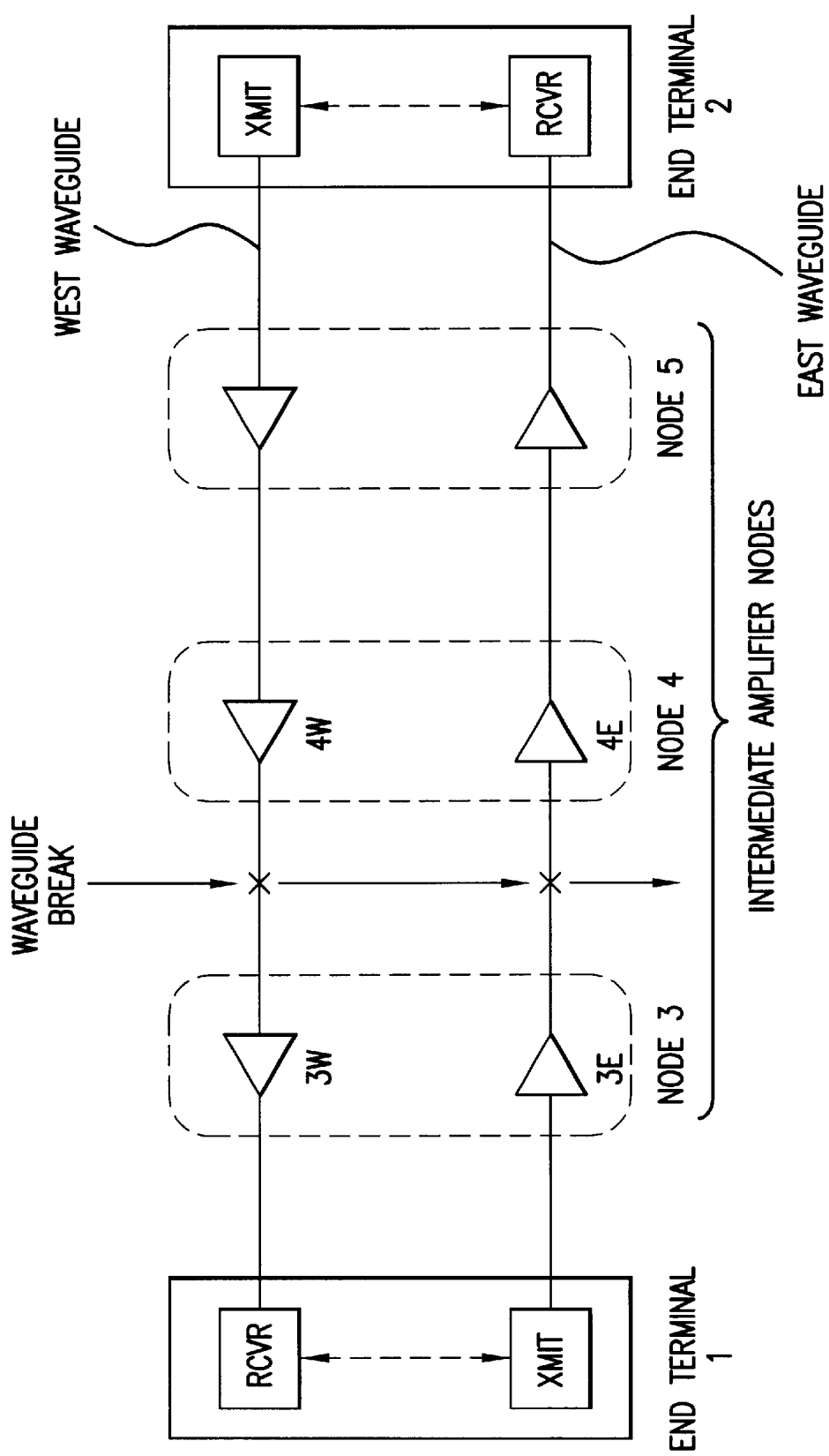
FIG. 1 shows an exemplary optical communication system including a plurality of intermediate amplifier nodes between two terminal nodes.

Again referring to the optical communication system shown in FIG. 1, a plurality of intermediate amplifiers are arranged along the paired East/West optical waveguides. The West terminal 1 and East terminal 2 (collectively the "end terminals") are equally nodes, and are generally distinguished from the intermediate nodes 3, 4, and 5 by the optical termination of the communication signals. In other words, end terminals typically include all the functionality of intermediate amplifiers 3, 4, and 5, and additionally include circuits providing end terminal functionality, such as optical signal multiplexing/demultiplexing, optical-to-electrical/electrical-to-optical conversion of the communication signals, etc. Specific end terminal functionality is not the subject of the present invention, and, thus, the term "node" as used in the context of the present invention will mean an end terminal or an intermediate amplifier.

Nodes are referred to as being "upstream" and "downstream" in relation to each other. Like the descriptions "East" and "West," these terms merely set forth the spatial relationship between nodes as defined by the transmission direction of a signal commonly traversing the nodes during a predetermined period of time. Thus, it can be seen that an upstream node will immediately become a downstream node in relation to a neighboring node upon a reversal in the transmission direction of the signal defining the spatial relationship between the two nodes.

Figure 2:
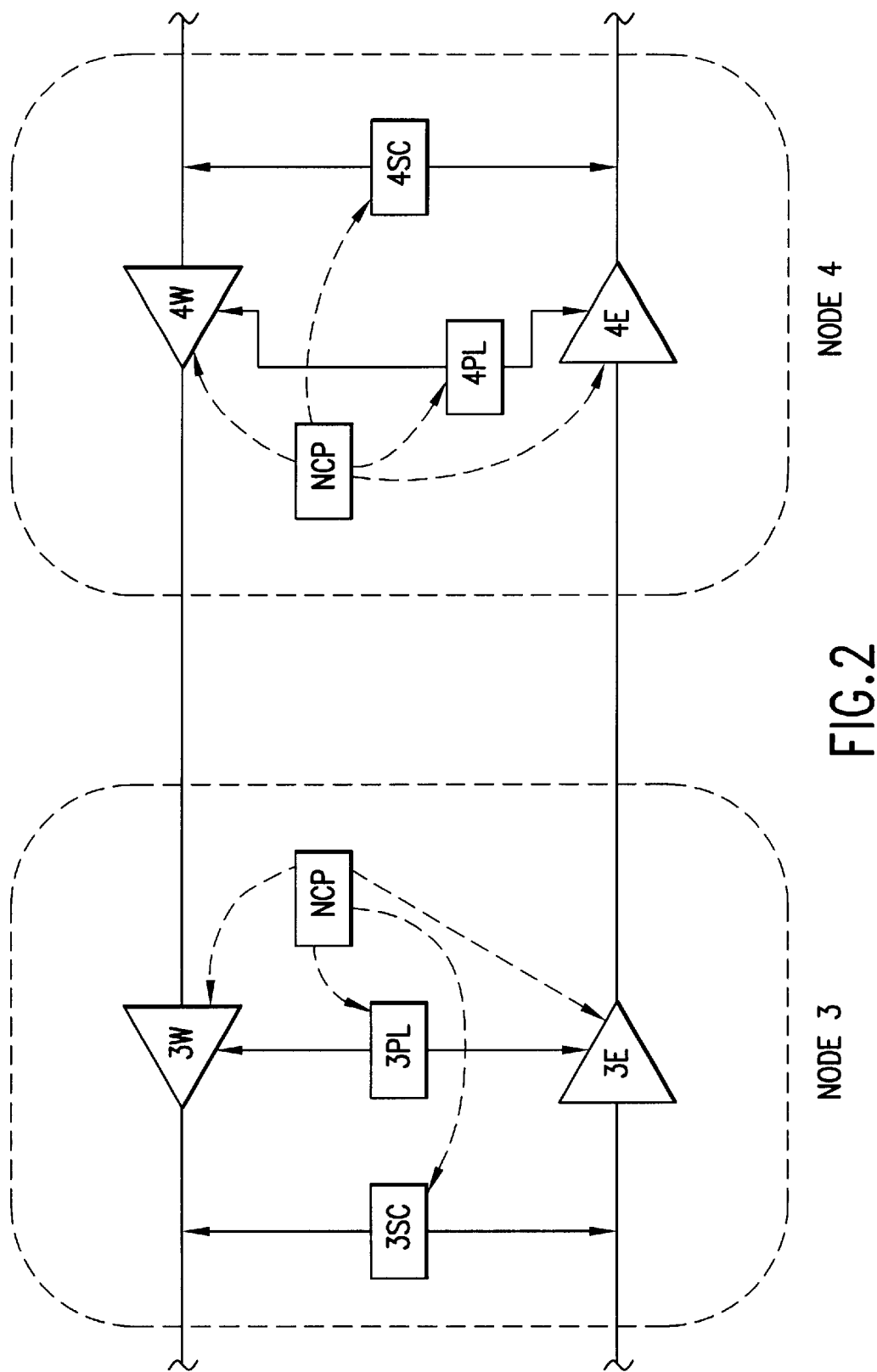
FIG. 2 show two intermediate amplifier nodes of the optical communication system in FIG. 1 in more detail.

Using like numbers and characters to indicate like elements throughout, the present invention will be described with reference to several presently preferred embodiments. FIG. 2 shows adjacent nodes 3 and 4 of FIG. 1 in greater detail. Each node comprises a service channel circuit (SC), a node control processor (NCP), and dual amplifiers; East (E) and West (W). Each amplifier typically comprises an optical amplifier driven by an optical energy source, such as a pump laser (PL), and associated control circuitry. The node control processor is conventional in nature, and as presently preferably comprises a Motorola 68302 microprocessor, a digital signal processor, associated memory and control circuitry.

FIG. 2 shows a single pump laser (PL) driving both amplifiers. However, as will be seen hereafter a plurality of separate pump lasers in various configurations may be applied to the amplifiers, either together of separately.

In the example, node 3, or the upstream node in this example, transmits at least one optical communication signal and a "service channel signal" downstream to node 4 via the East waveguide. The service channel signal, as used in description of the present invention, is an optical communication system management signal conveying operational status information, control signals, and other system management information. The nature and composition of the service channel signal can vary greatly from embodiment to embodiment. Generally, however, service channel signal will connote any separately distinguishable signal co-propagated with at least one information signal through the optical communication system.

As illustrated by FIG. 3A, the service channel signal may traverse the length of an optical waveguide node-by-node in a single direction. In this manner, a first service channel signal originating from the West terminal, to pick an arbitrary starting point, is transmitted to node 3, then to node 4, and so on until it reaches the East terminal. At node 4, following the example above, the service channel signal transmitted from node 3 is received by a service channel circuit 4SC, (see FIG. 2) discriminated and stored in memory (not shown), if necessary, and interpreted by the node control processor 4NCP. Information derived from the service channel signal by the node control processor may affect or monitor the operation of the elements within node 4. After discrimination of the service channel signal, the node control processor at node 4 may update or supplement the information contained in the service channel signal before its subsequent transmission downstream to node 5. In this manner, the service channel signal traverses the length of the East waveguide node by node.

Alternatively, the service channel signal may communicate between adjacent nodes, as illustrated in FIG. 3B. In this manner, the first service channel signal originating at node 3 is transmitted via the East waveguide to node 4. At node 4, the service channel signal transmitted from node 3 is received by a service channel circuit 4SC, discriminated and stored in memory (not shown), if necessary, and interpreted by the node control processor 4NCP. Again, information derived from the service channel signal by the node control processor may affect or monitor the operation of elements within node 4. After discrimination of the service channel signal, the node control processor at node 4 may update or supplement the information contained in the service channel signal and then "return transmit" the service channel signal back upstream to node 3.

The term "return transmit[ting]" is used to distinguish the node-by-node, length of the optical communication system scheme set forth above from an inter-adjacent node transmission scheme. In the former, a service channel signal, or a modified and/or supplemented form thereof, is transmitted in one direction between end terminals via a single waveguide. In the later, a service channel signal is transmitted in one direction by an upstream node, and then turned around at the downstream node and returned transmitted back to the upstream node. Naturally, some combination of these two scheme might be used to bi-directionally communicate between adjacent nodes, as well as traverse the optical communication path form terminal to terminal.

Using either scheme, system management information may be transmitted between any two nodes in the optical communication system. For example, service channel information originating at the West terminal and destined for node 5 would traverse intermediate nodes 3 and 4 along the East waveguide using the first scheme. Once the service channel signal reaches node 5, the node control processor at node 5 would discriminate the information and affect functionality at node 5 accordingly. Additional information destined for node 5, but originating at node 4, for example, would merely be melded into the existing service channel signal by the node control processor at node 4.

Using the second scheme in the example above, the service channel information destined for node 5 would be dropped off at node 3 by the service channel signal traveling between the West terminal and node 3, and subsequently conveyed by the service channel signal traveling between nodes 3 and 4. Thus, each intervening node serves as a mail box for information traversing a length of the optical communication system greater than a inter-adjacent node span. Multiple service channel signals might be incorporated into future optical communication systems to transmit local (intra-node or inter-adjacent nodes) and global system management information. The present invention is not limited to the a particular service channel architecture or methodology. The two schemes given above are merely examples. However, as will be seen, the service channel in a distributed intelligence communication system is integral to the present invention.

Unlike conventional systems which initiate an optical energy source shut down protocol based on a single event, typically the loss of optical power, the present invention uses a composite of several events to determine a system failure requiring the shut down of an optical energy source. Use of such a "composite signal" trigger to detect a system failure precludes "falsing," i.e., erroneous indications of a system failure, as well as better information regarding the nature of a system failure, and easier system reinitiating following correction of the system failure.

Returning to FIGS. 1 and 2, a first embodiment of the present invention will be described. Again, a break in the paired waveguides between nodes 3 and 4 is assumed. Following the waveguide break, a loss of optical power in communication signals traversing the East waveguide is detected at node 4. The loss detection is typically made by tapping, using for example a conventional 2% splitter, the East waveguide at some point in or near the optical amplifier (i.e., at the input or output of the amplifier, or between stages of a multi-stage amplifier) and discriminating the tapped signals using conventional circuitry. Additionally, the service channel signal transmitted from upstream node 3 is lost due to the waveguide break. Loss of the service channel signal is detected by the service channel circuit 4SC.

The node control processor, 4NCP, periodically interrogates the elements in node 4 including optical amplifier 4E, service channel circuit 4SC, and the tapped signals. Upon determining the coincidence of optical power loss and loss of the service channel signal, node control processor 4NCP determines a system failure and initiates a shutdown protocol for the optical energy source driving the one or both optical amplifiers at node 4. In one preferred embodiment, upon detection of a composite signal comprising the loss of the service channel signal and the at least one communication signal(s) on the East waveguide, the node control processor 4NCP would turn off the pump laser driving the optical amplifier 4W on the West waveguide. Thus, the optical energy presumably being pumped from node 4 into the fiber break between nodes 3 and 4 would be disabled.

The mirror image of this process occurs in node 3 involving a loss of optical power at optical amplifier 3W, a loss of the service channel signal at the service channel circuit 3SC, and a system failure detection by the node control processor 3NCP. This detection at node 3 results in the shut-off of the optical energy source driving optical amplifier 3E. In this manner, potentially harmful optical energy feeding into the waveguide break is shut-off while all other nodes and node functionality persist in the overall optical communication system.

In the foregoing discussion, the loss of the service channel signal is preferably determined in a downstream service channel circuit in an intelligent manner. That is, the loss of the service channel signal is not solely determined by monitoring the power level of the service channel signal. Rather, the "link state" between adjacent nodes as communicated by the service channel signal is monitored in real time, or in near real time basis, and determining the loss of the service channel is really a process of determining at the node control processor that coherent link state between adjacent nodes has been lost. Link state loss may be determined in conjunction with the service channel signal level loss to identify "loss" of the service channel signal. By monitoring not only the power level of the service channel, but also the inter-adjacent node link state provided by the service channel signal, falsing which may result from a transient drop in the service channel signal level, or momentary signal drop-out is avoided.

Figure 4:
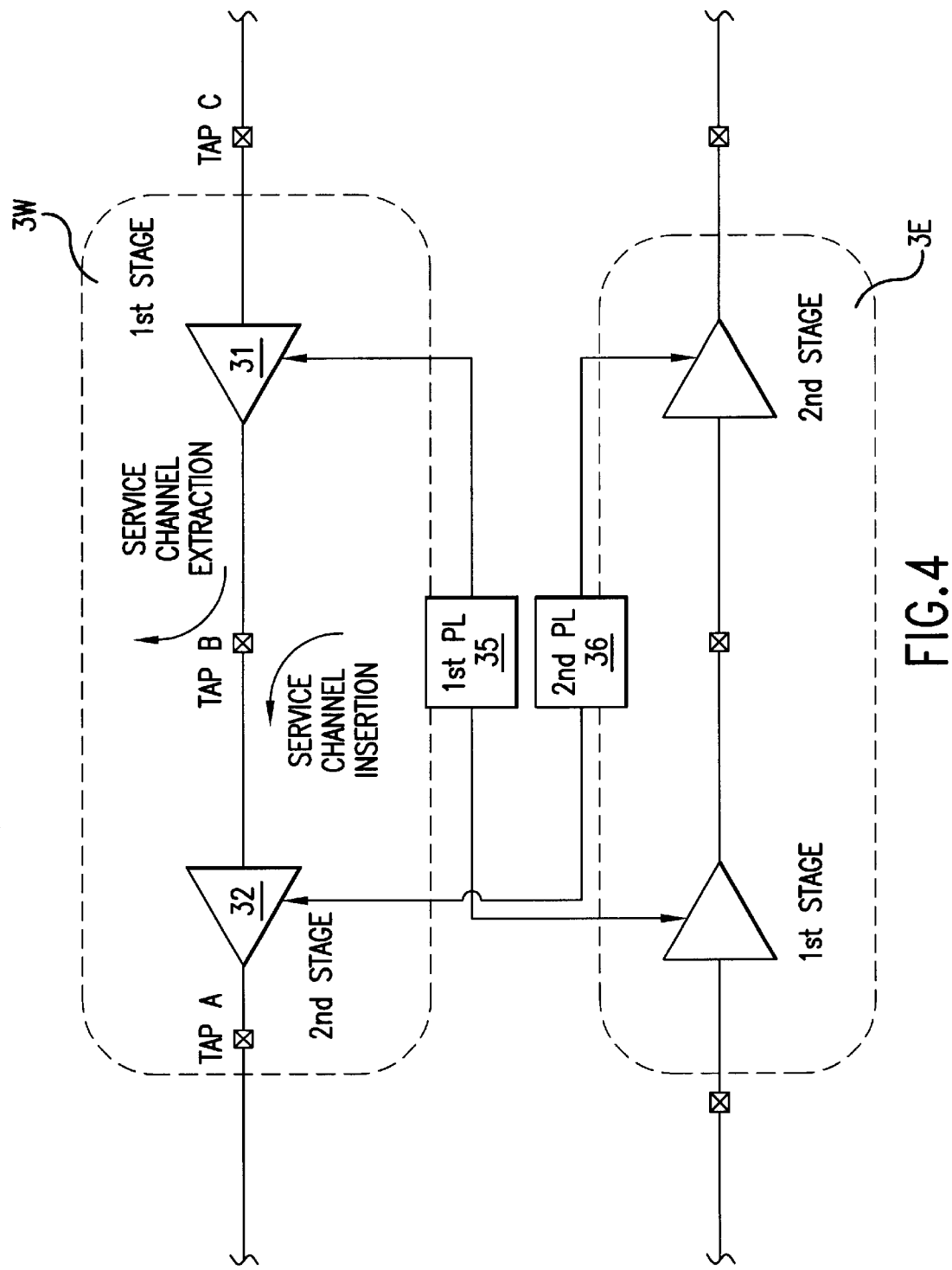
FIG. 4 shows one configuration of optical energy sources within a node of the optical communication system shown in FIG. 1 and FIG. 2.

Multiple stage optical amplifiers are often used in optical communication systems to provide higher gain with better noise performance. In another embodiment of the present invention, only one stage of a multiple stage amplifier is shut-off when a system failure is detected. Referring to FIG. 4, the optical amplifiers associated with node 3 are shown in greater detail, omitting for clarity the other elements of node 3. The first stage of the optical amplifier is typically a low noise stage, and the second stage a high power, or high gain, stage. In a presently preferred embodiment, amplifier 3W comprises a first stage 31 having a first section of active fiber, and a second stage 32 having a second section of active fiber. The first stage is driven by a first pump laser 35 and the second stage is driven by a second pump laser 36. In the presently preferred embodiment, the first pump laser operates at a wavelength of 980 nm, and the second pump laser operates at a wavelength of 1480 nm.

Figure 5:
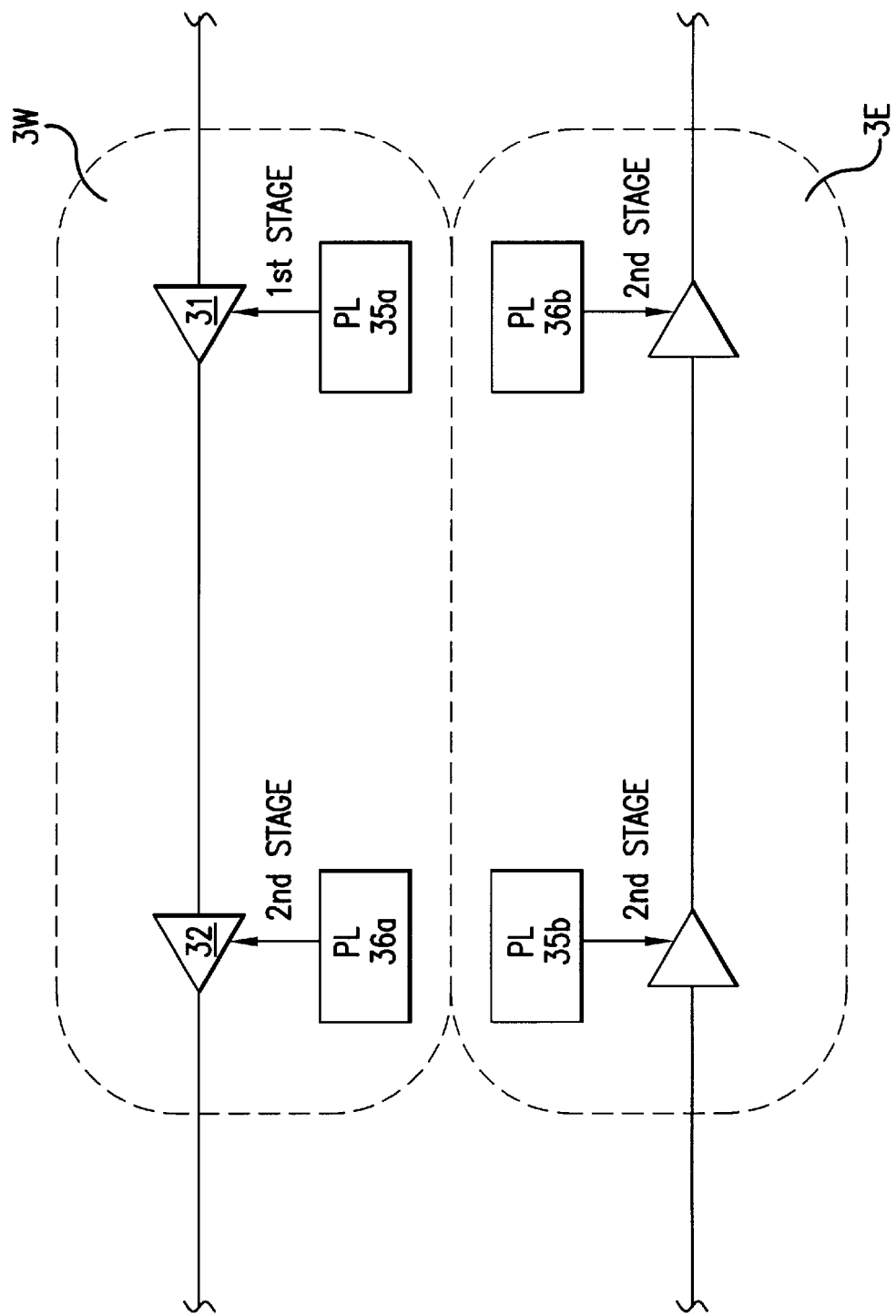
FIG. 5 shows another configuration of first optical energy sources within a node of the optical communication system shown in FIG. 1 and FIG. 2; and, FIG. 6 illustrates a disconnection system failure within the exemplary optical communication system.

In FIG. 4, a single pump laser drives both first stages of amplifiers 3E and 3W. Similarly, a second pump laser drives both second stages of amplifiers 3E and 3W. Alternatively, as shown in FIG. 5, separate first pump lasers (35a and 35b) are used to respectively drive the first stages of amplifiers 3W and 3E. Similarly, separate second pump lasers (36a and 36b) are used to respectively drive the second stages of amplifiers 3W and 3E. In another embodiment, a single first pump laser drive both first stages of amplifiers 3W and 3E while separate second pump lasers respectively drive the second stages of amplifiers 3W and 3E.

In the foregoing embodiments, only the 1480 nm optical energy provided by the second pump laser(s) is potentially harmful to the human eye. Accordingly, upon determining a system failure, the node control processor NCP at a given node shuts down only the appropriate second (1480 nm) pump laser(s) driving the second stage of exemplary two-stage optical amplifier shown in FIGS. 4 and 5.

Further, FIG. 4 shows possible tap points (A–C) at which the signal level of the optical communication signals and/or service channel signal might be detected by the node control processor.

The foregoing embodiments work exceptionally well in circumstances where a pair of East/West running optical waveguides are commonly broken. Another common system failure involves a "disconnect" on a single optical waveguide. For example, an optical fiber, it's coupler, or fitting may jiggle loose or otherwise mechanically fail at the input of the fiber to a node or node component.

Figure 6:
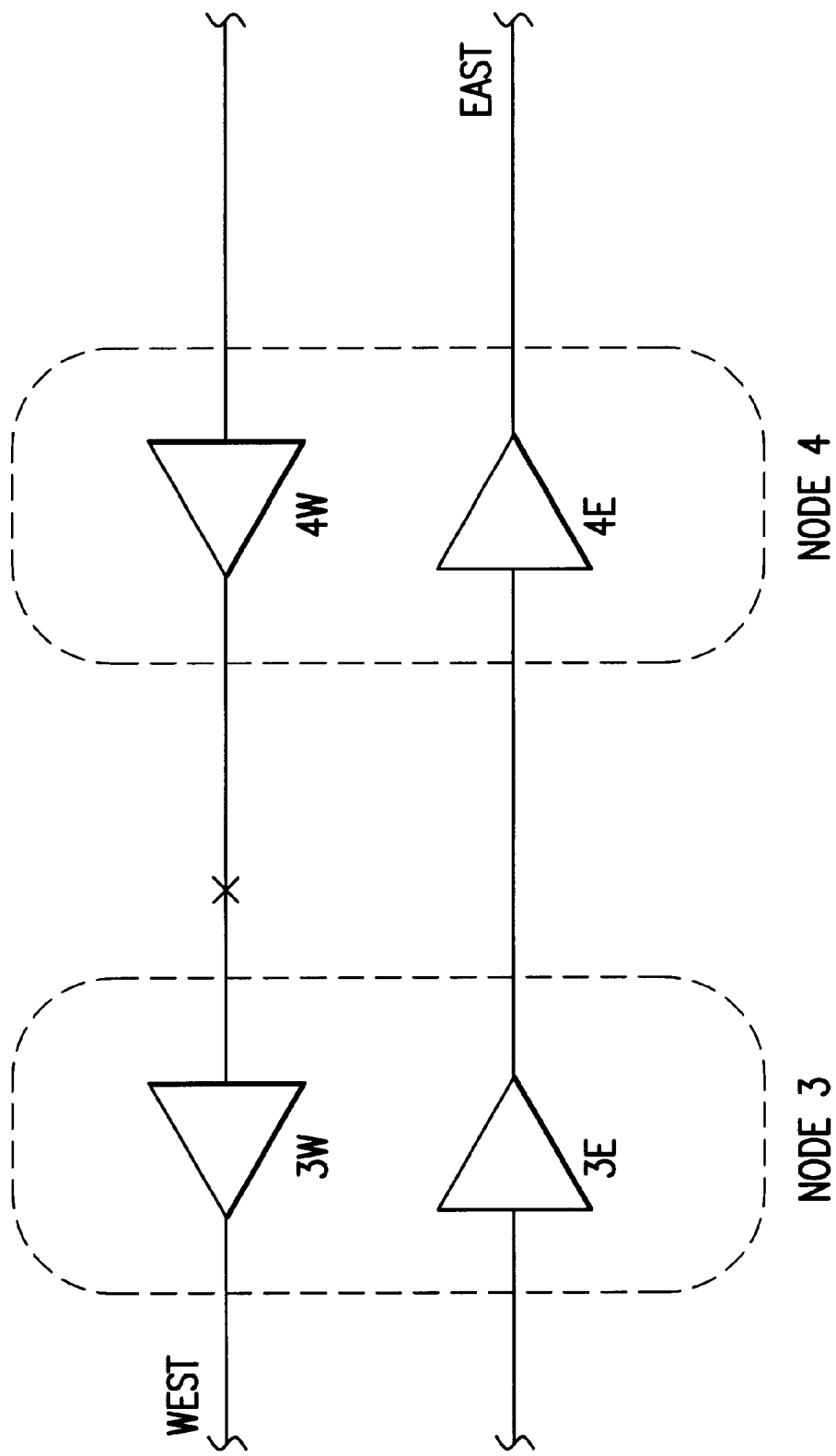

Considering FIG. 6, in a disconnect system failure occurs in the West waveguide between nodes 3 and 4. In the foregoing embodiment, since the link state between nodes 3 and 4 continues to exists through the service channel signal transmitted from node 3 to node 4 via the East waveguide, no system failure is detected at node 4 and the optical energy source driving optical amplifier 4W is not shut off.

To address this problem, a tone or other indicator is added to either the optical communication signal(s) or to the service channel signal. For example, unique tones may be overmodulated onto each optical communication signal at a terminal node using an analog local oscillator or a digital synthesizer. At a given node, the optical communication signals are tapped, discriminated, and interrogated for the tones by the node control processor. The absence of tones, as determined by the node control processor, may be used as a component in the composite signal, instead of monitoring service channel link state. Thus, optical energy feeding into a waveguide disconnection can be shut-down in a manner like that described above.

The present invention allows an optical communication system to intelligently shut down potentially harmful optical energy sources would otherwise place service personnel at risk during the correction of system failures such as waveguide breaks and disconnections. This may be done without shutting down the entire communication system as has been required by previous solutions. The foregoing embodiments have been given by way of example. The present invention is not limited to this examples, but is defined by the following claims.

What is claimed is:

1. A system for shutting down a pump laser in an optical communication system, the system comprising:
    an upstream node and a downstream node;
    wherein the upstream node transmits a first optical communication signal and a first service channel signal to the downstream node via a first optical waveguide, and receives a second optical communication signal and a second service channel signal from the downstream node via a second optical waveguide; and
    wherein the downstream node comprises:
        a downstream service channel circuit receiving the first service channel signal from the upstream node;
        a first downstream optical amplifier receiving the first optical communication signal from the upstream node and amplifying the first optical communication signal;
        a second downstream optical amplifier amplifying and transmitting the second optical communication signal to the upstream node;
        a downstream optical energy source adapted to drive at least the second downstream optical amplifier; and
        a downstream node control processor communicating with the downstream service channel circuit to determine the state of the first service channel signal, determining the level of the first optical communication signal, and communicating with the downstream optical energy source to shut off the downstream optical energy source upon determining a first alarm state in the first service channel signal, and an alarm level in the first optical communication signal.

2. The system of claim 1, wherein the downstream node control processor shuts down the optical energy source upon determining the alarm state in the first service channel signal indicating the loss of a link state between the upstream and downstream nodes, and the alarm level in the first optical communication signal indicating the absence of the first optical communication signal at the down stream node.

3. The system of claim 1, wherein the upstream node further comprises:

an upstream service channel circuit receiving the second service channel signal from the downstream node;
    a first upstream optical amplifier amplifying the first optical communication signal and transmitting the first optical communication signal to the downstream node;
    a second upstream optical amplifier receiving the second optical communication signal from the downstream node;
    an upstream optical energy source adapted to drive at least the first upstream optical amplifier; and
    an upstream node control processor communicating with the upstream service channel circuit to determine the state of the second service channel signal, determining the level of the second optical communication signal, and communicating with the upstream optical energy source to shut off the upstream optical energy source upon determining one of an alarm state in the second service channel signal, and an alarm level in the second optical communication signal.

4. The system of claim 3 wherein the upstream node control processor shuts down the optical energy source upon determining the alarm state in the second service channel signal and the alarm level in the second optical communication signal.

5. A system for shutting down a pump laser in a wavelength division multiplexed optical communication system transmitting a first service channel signal and a first plurality of optical transmission signals downstream via a first optical waveguide, and transmitting a second service channel signal and a second plurality of optical transmission signals upstream via a second optical waveguide, the wavelength division multiplexed optical communication system comprising N nodes, and the system for shutting down the pump laser comprising:
    node Ni, comprising;
        a service channel circuit receiving the first service channel signal from node Ni−1 and transmitting the first service channel signal to node Ni+1 via the first optical waveguide, and receiving the second service channel signal from node Ni+1 and transmitting the second service channel signal to node Ni−1 via the optical waveguide;
        a first optical amplifier receiving the first plurality of optical communication signals from node Ni−1, amplifying the first plurality of optical communication signals, and transmitting the amplified first plurality of optical communication signals to node Ni+1 via the first optical waveguide;
        a second optical amplifier receiving the second plurality of optical communication signals from node Ni+1, amplifying the second plurality of optical communication signals, and transmitting the amplified second plurality of optical communication signals to node Ni−1 via the second optical waveguide;
        a pump laser driving the first and second optical amplifiers; and
        a node control processor communicating with the service channel circuit to determine the signal state of the first service channel signal and the second service channel signal, communicating with the first optical amplifier to determine the level of the first plurality of optical communication signals, communicating with the second optical amplifier to determine the level of the second plurality of optical communication signals, and communicating with the pump laser to shut off the pump laser upon determining an alarm state in the first channel signal and an alarm level in the first plurality of optical communication signals.

6. The system of claim 5, wherein the node control processor shuts off the pump laser upon determining one of an alarm state in the second service channel signal and an alarm level in the second plurality of optical communication signals.

7. The system of claim 6, wherein the first optical amplifier comprises a first output tap at which the level of the first plurality of optical communication signals is determined, and wherein the second optical amplifier comprises a second output tap at which the level of the second plurality of optical communication signals is determined.

8. A system for shutting down a pump laser in a wavelength division multiplexed optical communication system transmitting a first plurality of optical transmission signals via a first optical waveguide, and transmitting a second plurality of optical transmission signals via a second optical waveguide, the wavelength division multiplexed optical communication system comprising N nodes arranged along the first and second optical waveguides, and the system for shutting down the pump laser comprising:
 a node Ni, comprising;
  a first service channel circuit receiving a first service channel signal transmitted from node Ni−1 via the first optical waveguide, and return transmitting the first service channel signal to node Ni−1 via the second optical waveguide;
  a second service channel circuit receiving a second service channel signal transmitted from node Ni+1 via the second optical waveguide, and return transmitting the second service channel signal to node Ni+1 via the first optical waveguide;
  a first optical amplifier receiving the first plurality of optical communication signals from node Ni−1, amplifying the first plurality of optical communication signals, and transmitting the amplified first plurality of optical communication signals to node Ni+1 via the first optical waveguide;
  a second optical amplifier receiving the second plurality of optical communication signals from node Ni+1, amplifying the second plurality of optical communication signals, and transmitting the amplified second plurality of optical communication signals to node Ni−1 via the second optical waveguide;
  a pump laser driving the first and second optical amplifiers; and
  a node control processor communicating with the first service channel circuit to determine the signal state of the first service channel signal received from node Ni−1, and communicating with the first optical amplifier to determine the level of the first plurality of optical communication signals, wherein the node control processor shuts off the pump laser upon a determining an alarm state in the first service channel signal received from node Ni−1, and an alarm level in the first plurality of optical communication signals.

9. The system of claim 8 wherein the node control processor shuts down the pump laser upon determining the alarm state in the first service channel signal received from the node Ni−1 and the alarm level in the first plurality of optical communication signals.

10. The system of claim 8, wherein the node control processor further communicates with the second service channel circuit to determine the signal state of the second service channel signal received from node Ni+1, and communicates with the second optical amplifier to determine the level of the second plurality of optical communication signals, and wherein the node control processor shuts off the pump laser upon a determining one of an alarm state in the second service channel signal received from node Ni+1, and an alarm level in the second plurality of optical communication signals.

11. The system of claim 10 wherein the node control processor shuts down the pump laser upon determining the alarm state in the second service channel signal received from node Ni+1 and the alarm level in the second plurality of optical communication signals.

12. A system for shutting down a pump laser in a wavelength division multiplexed optical communication system transmitting a first plurality of optical transmission signals via a first optical waveguide, and transmitting a second plurality of optical transmission signals via a second optical waveguide, the wavelength division multiplexed optical communication system comprising N nodes arranged along the first and second optical waveguides, and the system for shutting down the pump laser comprising:
 a node Ni, comprising;
  a first service channel circuit receiving a first service channel signal from node Ni−1 via the fist optical waveguide, and return transmitting the first service channel signal to node Ni−1 via the second optical waveguide;
  a second service channel circuit receiving the second service channel signal from node Ni+1 via the second optical waveguide, and return transmitting the second service channel signal to node Ni+1 via the first optical waveguide;
  a first optical amplifier receiving the first plurality of optical communication signals from node Ni−1, amplifying the first plurality of optical communication signals, and transmitting the amplified first plurality of optical communication signals to node Ni+1 via the first optical waveguide;
  a second optical amplifier receiving the second plurality of optical communication signals from node Ni+1, amplifying the second plurality of optical communication signals, and transmitting the amplified second plurality of optical communication signals to node Ni−1 via the second optical waveguide;
  a first pump laser driving the first optical amplifier;
  a second pump laser driving the second optical amplifier; and
  a node control processor communicating with the first service channel circuit to determine the signal state of the first service channel signal received from node Ni−1, and communicating with the first optical amplifier to determine the level of the first plurality of optical communication signals, wherein the node control processor shuts off the second pump laser upon determining an alarm state in the first service channel signal received from node Ni−1, and an alarm level in the first plurality of optical communication signals.

13. The system of claim 12, wherein the first optical amplifier comprises a first pre-amplifier stage, and a first power amplifier stage driven by the first pump laser, and wherein the second optical amplifier comprises a second pre-amplifier stage, and a second power amplifier stage driven by the second pump laser.

14. The system of claim 13, wherein the first pre-amplifier stage is driven by a third pump laser, and the second pre-amplifier stage is driven by a fourth pump laser.

15. The system of claim 13, wherein the first optical amplifier further comprises means positioned between the first pre-amplifier stage and the first power amplifier stage for extracting the first service channel signal transmitted from node Ni−1 via the first optical waveguide and for injecting the first service channel signal into the first optical waveguide for return transmission to node Ni−1.

16. The system of claim 13, wherein the second optical amplifier further comprises means positioned between the second pre-amplifier stage and the second power amplifier stage for extracting the second service channel signal transmitted from node Ni+1 via the second optical waveguide, and for injecting the second service channel signal into the second optical waveguide for return transmission to node Ni+1.

17. A method of shutting down a pump laser in a wavelength division multiplexed optical communication system comprising N nodes arranged along first and second optical waveguides, the method comprising the steps of:

receiving at node Ni a first plurality of optical communication signals and a first service channel signal from node Ni−1 via the first optical waveguide;

amplifying the first plurality of optical communication signals received at node Ni using a first rare-earth doped fiber amplifier driven by a pump laser;

receiving at node Ni a second plurality of optical communication signals from node Ni+1 via the second optical waveguide;

amplifying the second plurality of optical communication signals received at node Ni using a second rare-earth doped fiber amplifier driven by the pump laser;

determining the state of the first service channel signal received at node Ni;

determining the level of the first plurality of optical communication signals received at node Ni; and upon determining an alarm state in the first service channel signal and an alarm level in the first plurality of optical communication signals, shutting down the pump laser.

18. The method of claim 17, wherein the step of determining the level of the first plurality of optical communication signals is performed at the output of the first rare-earth doped fiber amplifier.

19. The method of claim 17, further comprising the steps of:

receiving a second service channel signal at node Ni from node Ni+1 via the second optical waveguide;

determining the state of the second service channel signal received at node Ni;

determining the level of the second plurality of optical communication signals at node Ni;

upon determining one of an alarm state in the second service channel signal and an alarm level in the second plurality of optical communication signals, shutting down the pump laser.

20. The method of claim 19, wherein the step of determining the level of the second plurality of optical communication signals is performed at the output of the second rare-earth doped fiber amplifier.

* * * * *